United States Patent [19]

Andrews et al.

[11] 4,275,992
[45] Jun. 30, 1981

[54] MODE CONTROLLED ATTACHMENT OF ROTOR MOUNTED COMPONENTS

[75] Inventors: James R. Andrews; Rodney W. Balke; Victor L. Berry, all of Arlington, Tex.

[73] Assignee: Textron, Inc., Providence, R.I.

[21] Appl. No.: 28,341

[22] Filed: Apr. 9, 1979

[51] Int. Cl.³ .............................................. B64C 7/00
[52] U.S. Cl. ............................ 416/146 R; 416/500; 248/595; 248/638
[58] Field of Search ....................... 416/146 R, 500, 5; 244/17.13, 17.27; 188/1 B; 74/574; 248/583, 585, 580, 638, 595, 586, 587

[56] References Cited

U.S. PATENT DOCUMENTS

| | | | |
|---|---|---|---|
| 3,163,378 | 12/1964 | Balke et al. | 244/17.27 |
| 3,698,663 | 10/1972 | Balke et al. | 244/17.27 |
| 3,845,917 | 11/1974 | Drees | 244/17.27 |
| 3,858,831 | 1/1975 | Halwes | 244/17.27 |
| 3,896,446 | 7/1975 | Kondoh et al. | 416/146 R |
| 4,088,042 | 5/1978 | Des Jardins et al. | 416/500 X |
| 4,111,386 | 9/1978 | Kenigsberg | 416/500 X |

Primary Examiner—John M. Jillions
Attorney, Agent, or Firm—Richards, Harris & Medlock

[57] ABSTRACT

An above-rotor mount (30) for a helicopter (10) comprises an upper plate (32) coupled to a lower plate (34) by means of links (42, 44, 46 and 48). The lower plate (34) is connected to a rotating rotor shaft (16) and a non-rotating stand pipe (40) extending inside the rotor shaft. The links (42, 44, 46 and 48) are focused to control the mode shapes and dynamic response of the mounted components at a preselected frequency, such as the predominant rotor harmonic. Springs (50, 52) are connected between the plates (32, 34) for damping.

14 Claims, 6 Drawing Figures

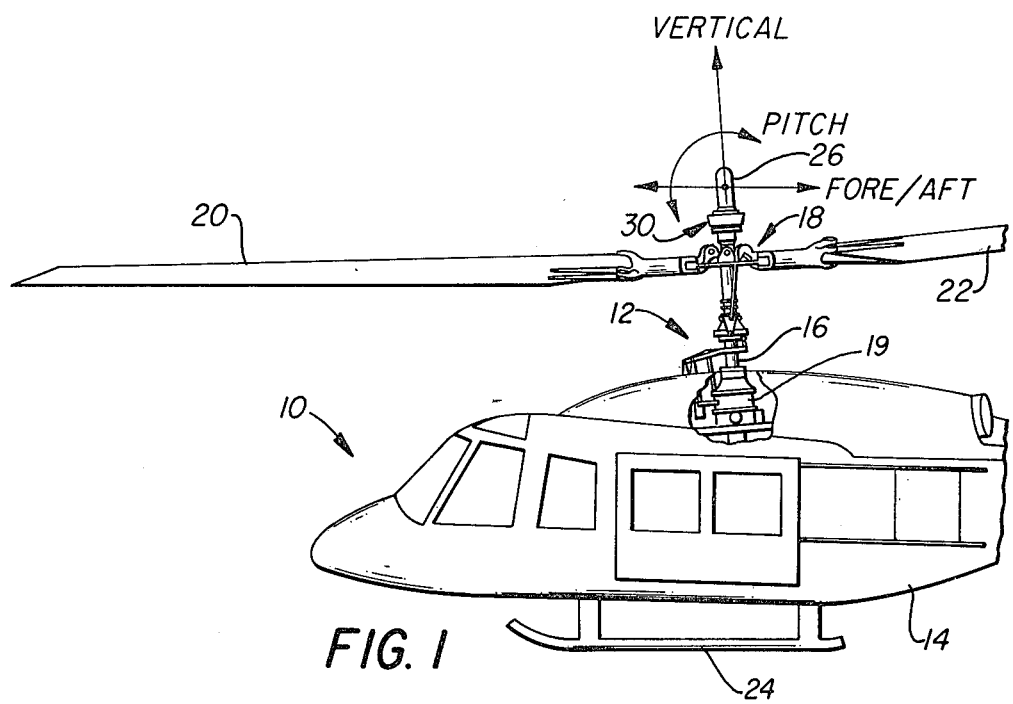
FIG. 1
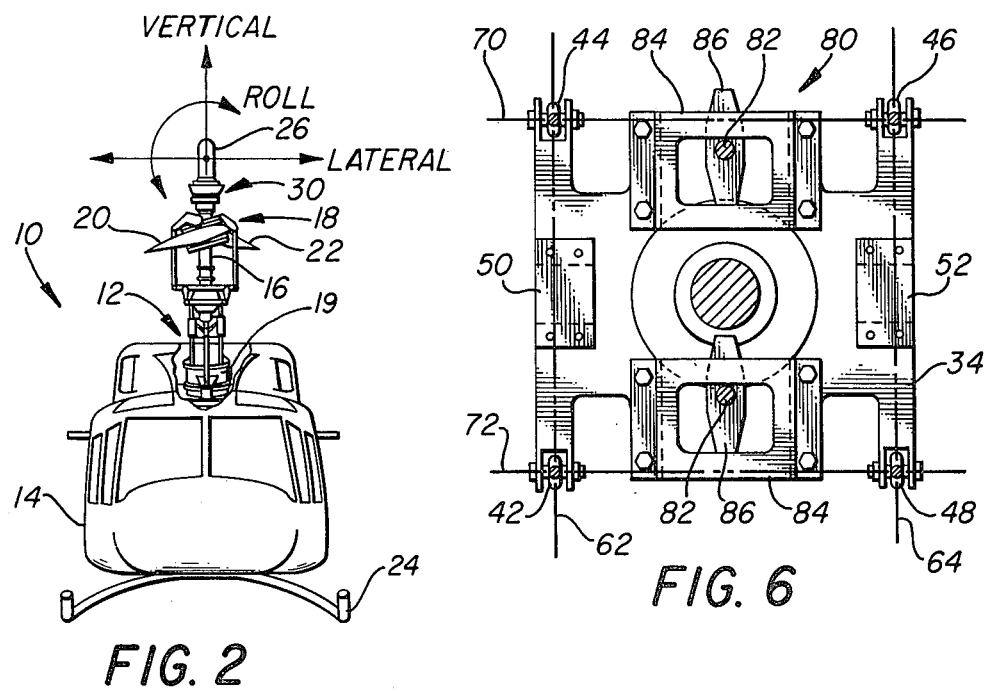
FIG. 2
FIG. 6

MODE CONTROLLED ATTACHMENT OF ROTOR MOUNTED COMPONENTS

TECHNICAL FIELD

The present invention relates generally to rotary wing aircraft. More particularly, this invention concerns an apparatus for mounting instrumentation above the lifting rotor of a helicopter.

BACKGROUND ART

The utilization of rotary wing aircraft or helicopters is increasing. Helicopters have capabilities which are uniquely suited to the performance of some missions, for which fixed wing aircraft would be unsuitable. Helicopters require minimum space for takeoff and landing, and are capable of hovering. On the other hand, fixed wing aircraft are generally capable of higher forward speeds, but require lengthy runways for takeoff and landing and are not capable of hovering. The helicopter is highly maneuverable, particularly at low speeds, and is an ideal vehicle for observation or point to point transportation of personnel or cargo.

In some instances, it is desirable to locate instrumentation or other components above the lifting rotor of a helicopter. For instance, it can be advantageous during military operations to mount surveillance equipment or sighting devices above the rotor. This allows the helicopter to hover in a concealed position with minimum exposure to enemy detection and fire.

Above-rotor mounting of such devices, however, involves several difficult problems. Such devices must be connected to the rotor, the origin of large vibratory forces which can adversely affect the operation and useful life of any device attached thereto. Sighting devices and other electronic instruments are relatively delicate and have structural design limitations with respect to translational and rotational motions. In addition, the kinematics of the mounted device are very important. Operational accuracy of such devices is affected in various degrees by the particular motions thereof. Fore and aft movement of a sighting device, for instance, is less critical than roll and pitch. The prior art attempts to provide a suitable mounting have allowed excessive rotation and/or vibration of the mounted device, and reduced mobility of the rotor hub. For some rotor designs, this reduced mobility results in higher blade loads and increased hub excitation forces and vibrations. A further consideration for some helicopter designs is to mount the equipment above the rotor in such a manner that vibrations in the fuselage, which affect pilot proficiency, crew and passenger comfort, and equipment reliability, are not seriously degraded. Some mounts require very soft mounting frequencies to achieve the desired isolation, which is accompanied by undesireable low frequency transients. There is thus a need for a stiffer, more stable above-rotor mount which does not adversely affect mobility of the rotor hub.

DISCLOSURE OF INVENTION

The present invention comprises an above-rotor mount for a helicopter which overcomes the foregoing and other difficulties associated with the prior art. In accordance with the invention, there is provided a mount for non-rotatably supporting electronic equipment, instrumentation, sighting device or the like atop a helicopter lifting rotor assembly. The mount is constructed to minimize transfer of rotational and translational motions to the mounted device by introducing a new set of natural frequencies and thus coupling the rotor shaft bending modes away from the predominant rotor harmonic. The present invention controls the response mode for the mounted device through nodalization and focal isolation principles. Use of the present invention preserves mobility of the main rotor hub and does not induce higher blade loadings or increase the hub excitation forces, whereby the existing ride quality and equipment reliability is maintained.

More specifically, the above-rotor mount of the present invention comprises a pair of plates pivotally interconnected by focal links. A lower plate is anchored to a non-rotating standpipe extending within the rotor shaft, which is also rotatably secured to the lower plate. Four links couple the lower plate to an upper plate, and are oriented in predetermined directions to focus the reaction forces through the vibration nodal points of the rotor shaft and lower structure at selected frequencies. In particular, the links define pitch and roll focal planes which intersect in focal axes extending through their respective pitch and roll focal points of the pylon, and fuselage at the predominant rotor harmonic. Roll and pitch of an instrument attached to the upper plate are thus minimized. In addition, an elastomeric spring interconnects the plates to provide tuning and damping of translational motions therebetween. Preferably, a stop assembly also interconnects the plates to provide a safety factor in the event of link failure.

BRIEF DESCRIPTION OF DRAWINGS

A more complete understanding of the invention can be had by referring to the following Detailed Description in conjunction with the accompanying Drawings, wherein:

FIG. 1 is a partial side view of a helicopter incorporating the above-rotor mount of the present invention;

FIG. 2 is a front view (partially cut away) of the helicopter shown in FIG. 1;

FIG. 6 is a horizontal cross sectional view taken generally along lines 6—6 of FIG. 4 in the direction of the arrows.

DETAILED DESCRIPTION

Figure 4:
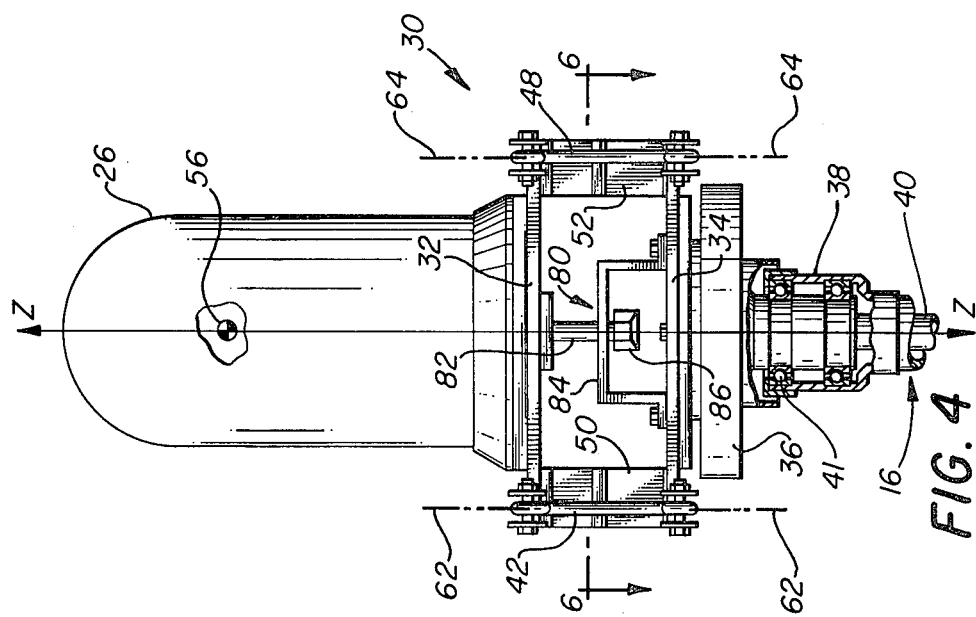
FIG. 4 is a vertical end view (partially cut away) of FIG. 3.

Referring now to the Drawings, wherein like reference numerals designate like or corresponding parts throughout the several views, and particularly referring to FIGS. 1 and 2 there is shown a helicopter 10 having a pylon 12 and a fuselage 14. The pylon 12 consists of the rotor shaft 16, lifting rotor assembly 18, transmission 19, and attached controls and accessories. The rotor shaft 16 extends upwardly from the transmission 19. A rotor assembly 18 including outwardly extending blades 20 and 22 is secured to the rotor shaft 16 for rotation therewith. Landing skids 24 are secured to the fuselage 14 for contact with the ground.

A dome 26 is mounted above the rotor assembly 18. Under some circumstances, it is desirable to locate electronic equipment above the rotor assembly 18 so as to minimize exposure of the helicopter 10. For example, a sighting device, radar, or electronic surveillance equipment can be housed within the dome 26. The dome 26 and the components contained therein are supported by a mount 30 incorporating the present invention. As will be more fully described hereinafter, the mount 30 controls the forced response mode shapes originating from the rotor assembly 18 so as to minimize translation and rotation of the components contained in the dome 26.

Figure 3:
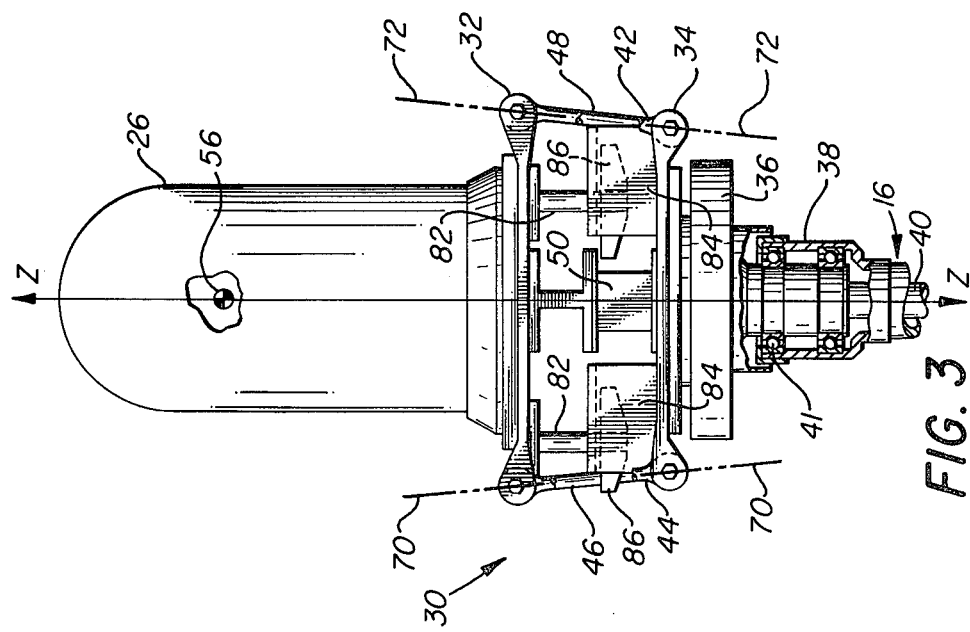
FIG. 3 is a vertical side view (partially cut away) showing constructional details of the present invention.

Referring to FIGS. 3 and 4, there are shown the constructional details of the above-rotor mount 30. The mount 30 includes an upper plate 32 supporting the dome 26 and the components therein. A lower plate 34 is connected to the drive shaft 16 by means of adapters 36 and 38. The outside adapter 38 is connected to the rotor shaft 16 for rotation therewith. One end of the inside adapter 36 is secured directly to the lower plate 34. The other end of the inside adapter 36 extends within the outside adapter 38 and is secured to a nonrotating standpipe 40 within the rotor shaft 16. The lower end of the standpipe 40 is preferably attached to the transmission case (not shown) of the rotor drive assembly located in the pylon 12. Vertical line Z—Z represents the coincidental axes of rotor shaft 16 and standpipe 40. Suitable bearings 41 are provided between stationary adapter 36 and rotating adapter 38. It will thus be apparent that rotor shaft 16 is rotatably secured to mount 30, which is constrained against rotation therewith by stationary standpipe 40.

Upper plate 32 and lower plate 34 are coupled together by links 42, 44, 46 and 48. Each link includes at both ends thereof spherical bearings having mutually perpendicular axes of rotation. According to the preferred construction, two pairs of links having substantially equal lengths and symmetric positions with respect to line Z—Z are employed. The links 42, 44, 46 and 48 are oriented to define focal planes intersecting in focal axes which extend through preselected focal points, the locations of which are a function of the dynamic characteristics of the helicopter 10. It will thus be apparent that the plates 32 and 34 are interconnected in a manner which permits relative motion therebetween. Elastomeric elements 50 and 52 are secured between the plates 32 and 34 to provide suitable frequency tuning and damping. The elastomeric elements 50 and 52 serve as tuned spring restraints between the plates 32 and 34 in the lateral and longitudinal directions at the desired excitation frequency. If desired, mechanical springs can be substituted for the elastomeric elements 50 and 52.

Figure 5:
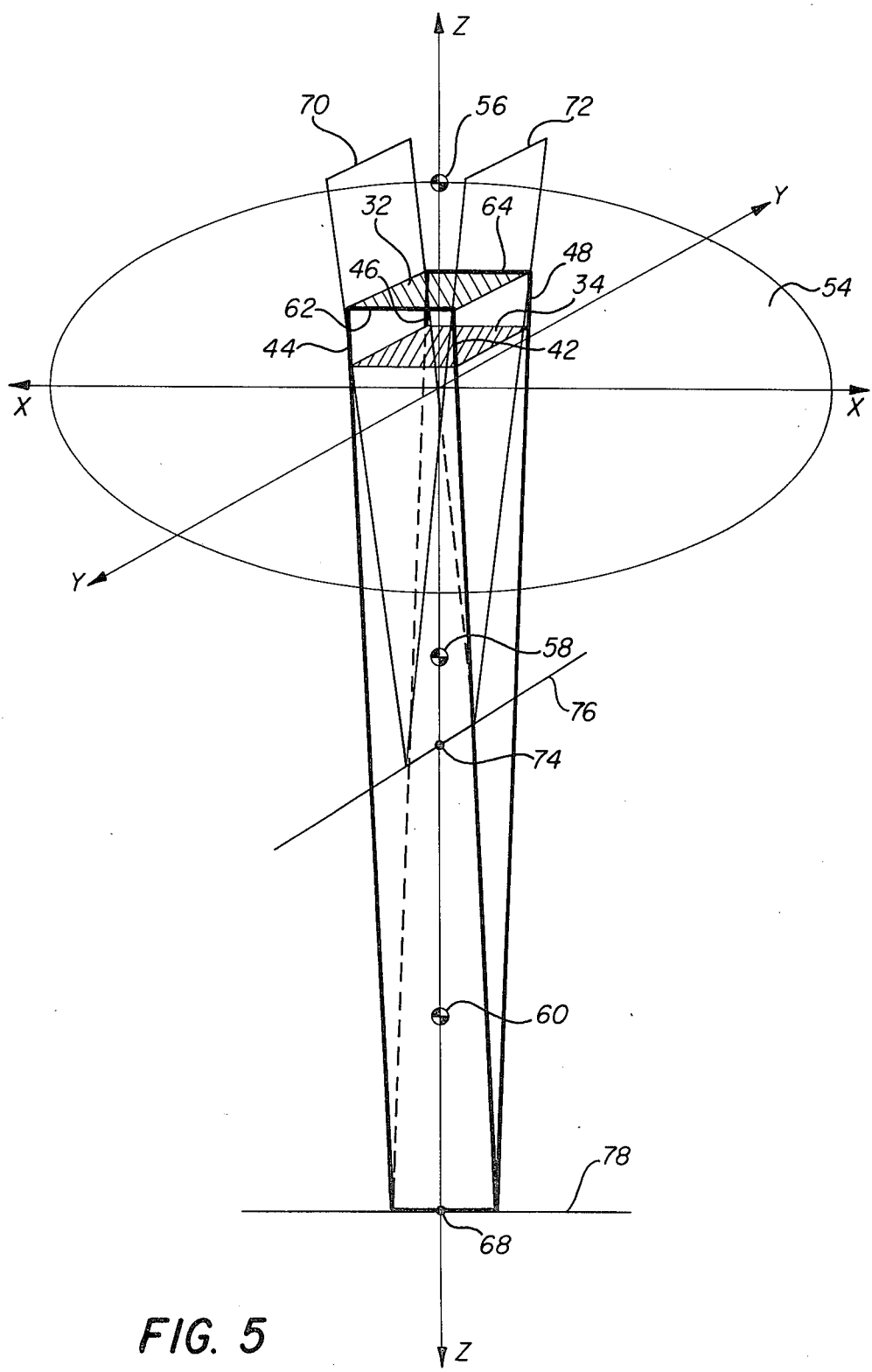
FIG. 5 is a perspective illustration of the geometric relationships employed in the invention.

A better understanding of the geometric relationships employed in the above-rotor mount 30 can be had by reference to FIG. 5. Line X—X represents the longitudinal or fore and aft axis. Line Y—Y represents the lateral axis. Plane 54 represents the plane of rotation of the rotor assembly 18. Line Z—Z represents the vertical axis or the axis of the mast or rotor shaft 16. Point 56 corresponds to the center of gravity of the mounted device enclosed within dome 26, and is located along line Z—Z above the rotor plane 54. Points 58 corresponds to the center of gravity of the pylon 12, and is located along line Z—Z below the rotor plane 54. Point 60 is located along line Z—Z below point 58, and represents the center of gravity of fuselage 14. Points 56, 58 and 60 are thus colinear and vertically spaced along the axis of the rotor shaft 16.

The focal links 42, 44, 46 and 48 are depicted in schematic form in FIG. 5. Links 42 and 44 and links 46 and 48 define respectively two longitudinal or roll focal planes 62 and 64 positioned on opposite sides of the fore and aft axis, line X—X. Planes 62 and 64 intersect in a longitudinal line or roll focal axis 78 extending substantially horizontally through a roll focal point 68. Links 42 and 48 and links 44 and 46 define lateral or pitch focal planes 70 and 72, respectively, located on opposite sides of line Y—Y, the lateral axis. Planes 70 and 72 intersect in a lateral line or pitch focal axis 76 extending substantially horizontally through a pitch focal point 74.

It will be understood that the locations of roll focal point 68 and pitch focal point 74 vary in accordance with the vibratory characteristics of the system and the cyclic frequency of rotor assembly 18. Preferably, the locations of points 68 and 74 are respectively selected to coincide with the vibration nodal points in roll and pitch in the forced response mode shapes at the predominant rotor harmonic. In a two-bladed helicopter the predominant rotor harmonic is two per revolution of the rotor. During flight, helicopters operate at substantially constant rotor speeds, whereby the predominant excitation frequency can be accurately determined.

At this frequency, or any other desired frequency, the null points for rotational motions of the components contained in dome 26 can be determined through dynamic analysis. Preferably, the kinematic focal isolation principle, which is based on rigid body concepts, is applied first. This principle is analytically similar to a hinge and spring, and an explanation of focal isolation can be found in U.S. Pat. No. 3,163,378. In applying this principle to isolation of the dome 26, moments are summed about the center of gravity of the dome, such that the locations of two unique points, where rotational motions are nulled or cancelled for a given spring rate, can be determined for the desired frequency. This is done for both the pitch and roll planes. The analysis yields unique combinations of focal point locations and equivalent spring rates required to achieve rotational nulls of the device contained in dome 26 at the desired frequency. This analysis also yields a pair of special focal point locations wherein a rotational null is achieved at zero spring rate: one logical location in both the pitch and roll modes of rotation being point 56, and the other point being located somewhere above or below point 56 along axis Z—Z. The preliminary locations of the roll and pitch focal points to null both fuselage and above rotor component rotations at a selected frequency are thus determined through rigid body analysis.

Following application of the kinematic focal isolation principle, the nodal beam isolation principle is next applied. This principle is based on flexible body theory, and an explanation of nodalization can be found in U.S. Pat. No. 3,845,917. The flexible body analysis is utilized to adjust the results of the rigid body analysis to account for structural deflections of the fuselage 14, rotor shaft 16 and the standpipe 40 at the selected frequency. The exact locations of roll focal point 68 and pitch focal point 74 are thus functions of the bending frequency of rotor shaft 16, the selected excitation frequency, mass inertias and CG location of the device housed in dome 26, spring rate of elastomeric elements 50 and 52, as well as the masses, CG locations and inertias of the pylon 12 and fuselage 14.

If additional torsional rigidity is required, links 42 and 44 and links 46 and 48 in their longitudinal planes can be oriented vertically as if focal roll point 68 were located at infinity. That is, planes 62 and 64 would be parallel and would not intersect.

Referring to FIG. 6 in conjunction with FIGS. 3 and 4, the above-rotor mount 30 preferably includes a stop assembly 80. The stop assembly 80 comprises two pins 82 secured to the upper plate 32. Each pin 82 extends downwardly through an opening provided in a bracket 84 anchored to the lower plate 34. Stop plates 86 are anchored to the ends of pins 82 and are positioned within brackets 84. The openings in the brackets 84 are dimensioned to permit relative motion between the plates 32 and 34 without interference. However, in the event of an emergency, such as failure of one of the links 42, 44, 46 or 48, the stop assembly 80 provides a redundant vertical load path to react the overturning moment on the dome 26. The stop assembly 80 thus provides an additional safety factor.

From the foregoing, it will be understood that the present invention comprises a novel above-rotor mount having numerous advantages over the prior art. One signficant advantage is that components attached to the mount are supported in a manner which controls and minimizes pitch and roll of the mounted components at a preselected frequency. The above-rotor mount of the present invention focuses reaction forces through focal points located by dynamic analysis using both rigid body and flexible body concepts. Controlling the mode shapes and dynamic response characteristics results in greater stability for the rotor mounted components. The application of the invention is not limited to a particular rotor design, number of blades, or harmonic excitation frequency. In addition, use of the present invention does not unduly impair rotor hub mobility. Other advantages will suggest themselves to those skilled in the art.

Although particular embodiments of the invention have been illustrated in the accompanying drawings and described in the foregoing detailed description, it will be understood that the invention is not limited to the embodiments disclosed, but is capable of numerous rearrangements, modifications, and substitutions of parts and/or elements without departing from the spirit and scope of the invention.

We claim:

1. A mount for supporting a device above the lifting rotor of a helicopter having a rotor shaft, comprising:
   an upper plate, the device being mounted on said upper plate;
   a lower plate;
   means extending through the rotor shaft for supporting said lower plate and constraining said lower plate against rotation with the rotor;
   two sets of links pivotally coupled between said upper and lower plates, said links defining at least two focal planes intersecting in at least one focal axis extending through a predetermined rotational null point to control the dynamic response mode of the mounted device; and
   means connected between said upper and lower plates for damping motion between said plates.

2. The mount of claim 1, wherein each of said links includes spherical bearings at both ends thereof.

3. The mount of claim 1, wherein said links are coupled to said upper and lower plates at points located symmetrically about an upright axis extending through the centers of said plates.

4. The mount of claim 1, further including:
   stop means connected between said upper and lower plates for limiting movement therebetween.

5. The mount of claim 1, wherein opposite sets of links define longitudinal or roll focal planes intersecting in a roll focal axis extending through a point corresponding to the location of the roll focal point.

6. The mount of claim 1, wherein opposite sets of links define lateral or pitch focal planes intersecting in a pitch focal axis extending through a point corresponding to the location of the pitch focal point.

7. The mount of claim 1, wherein said links define longitudinal and lateral pairs of planes, said longitudinal planes intersecting in a line extending through a point corresponding to the location of the roll focal point, and said lateral planes intersecting in a line extending through a point corresponding to the location of the pitch focal point.

8. A mount for supporting and controlling the dynamic response mode of a device located above the rotor of a helicopter with a rotor shaft, comprising:
   an upper plate, the device being mounted on said upper plate;
   a lower plate;
   a nonrotating standpipe extending through the rotor shaft, said lower plate being secured to said standpipe and constrained against rotation with the rotor;
   two pairs of links pivotally coupled between said upper and lower plates;
   said links defining two pairs of opposite focal planes intersecting in two focal axes each extending through a predetermined rotational null point; and
   means secured between said upper and lower plates for damping motion therebetween.

9. The mount of claim 8, wherein said links define longitudinal and lateral pairs of focal planes, said longitudinal planes intersecting in a roll focal axis extending through a point corresponding to the location of the roll focal point, and said lateral pair of planes intersecting in a pitch focal axis extending through a point corresponding to the location of the pitch focal point.

10. The mount of claim 8, wherein each of said links includes spherical bearings at both ends thereof.

11. The mount of claim 8, further including:
    stop means connected between said upper and lower plates for limiting relative movement therebetween.

12. In combination with a helicopter having a rotatable rotor shaft, an above-rotor mount which comprises:
    a stationary standpipe extending through the rotor shaft, said standpipe including an upper end;
    an upper plate;
    a lower plate anchored to the upper end of said standpipe;
    means rotatably interconnecting the rotor shaft and said lower plate;
    two pairs of links pivotally coupled between said upper and lower plates;
    said links defining two pairs of focal planes intersecting in two distinct focal axes, each axis extending through a predetermined rotational null point located substantially along the central axis of the rotor shaft and below said plates; and
    spring means secured between said upper and lower plates for damping motion between said plates.

13. The above-rotor mount of claim 12, further including:
    stop means connected between said upper and lower plates for limiting relative movement therebetween.

14. The above-rotor mount of claim 12, wherein each of said links includes spherical bearings at both ends thereof.

* * * * *